Patented Mar. 19, 1929.

1,705,813

UNITED STATES PATENT OFFICE.

JEAN GEORGES KERN AND CHARLES J. SALA, OF WILMINGTON, DELAWARE, ASSIGNORS TO E. I. DU PONT DE NEMOURS & COMPANY, OF WILMINGTON, DELAWARE, A CORPORATION OF DELAWARE.

COLOR PRINTING PASTE AND PROCESS OF MAKING SAME.

No Drawing.   Application filed February 9, 1927. Serial No. 167,066.

This invention relates to dyestuff pastes, and more particularly to dyestuff pastes of vat colors, including both the indigoid and anthraquinone types for printing textile fabrics.

This case is in the nature of a continuation in part of application of Charles J. Sala, Serial Number 69,706, filed November 17, 1925.

Vat colors are insoluble dyestuffs which are reduced by hydrosulfite in the presence of alkali. The reduced body or leuco-compound is soluble and acts as a dyestuff. The reduction is effected in a thick paste on the cloth by steaming. The process suffers from the fact that during the short steaming it is extremely difficult to effect the reduction of the vat color, even though extraordinary care is taken in the preparation of the dyestuff paste as distinct from the printing paste, such care resulting in a very finely divided, smooth color paste which contains the solid matter in a highly dispersed form so that interaction may be as complete as possible. A constant complaint in the printing trade is that the vat color printing pastes produce specky prints and contain insoluble coloring matter which is partially due to the drying out of the pastes in their containers after they have been open. In order in a way to overcome this difficulty, the vat color pastes must be kept in a cool and humid storage room.

This invention has as an object the improvement of vat color pastes by making them more subject to reduction and therefore yielding uniform prints free from speckiness and of greater brightness. A further object is to allow of the more complete utilization of the dyestuff used. A still further object is to prevent the drying out of vat color pastes.

These objects are accomplished by the following invention in which the vat color paste is mixed with a strongly alkaline organic body soluble in water and possessing a high boiling point. These bodies have a very strongly solvent action on vat colors.

We have found that the solubility of pastes, as well as their stability, can be increased considerably by the use of new assistants. These new assistants may comprise a crude ethylolamine mixture, for instance a mixture of di-ethylolamine and tri-ethylolamine which may be obtained from the distillation of the reaction products of ethylene oxide and ammonia. These products contain valuable properties which when added to color pastes give greatly improved results.

The average analysis of this crude mixture of di- and tri-ethylolamine shows, by vacuum distillation, the following characteristics:

*100 gms. crude mixture yield:*

28 gms. distillate which pass over between 130–250° C. under 150 m/m vacuum-di-ethylolamine B. P. 217–18

65 gms. distillate over 250–283° C. under 150 m/m tri-ethylolamine B. P. 277–280

7 gms. residue
——
100

In preparing our color pastes we proceed as follows:

The dyestuff paste as produced in the course of manufacture of Ponsol blue GD (Schultz No. 842) is converted into a press cake containing 30% dry color.

400 parts of the press cake are then mixed with
20 parts of glycerine and
580 parts of the material (comprising the new assistant)

It is possible to vary the quantities considerably without losing the advantages of the invention; thus a paste made by mixing:

217 parts of a 30% press cake
273 parts of ethylolamine mixture and
10 parts of glycerine is very much better than the commercial pastes but it is not quite as good as the one previously described. To get the best results the quantity of assistant should not be reduced much below 50%.

Fifty parts of a press cake of Ponsol violet RRD (Schultz No. 766) containing 40% of water and 10% dry color are mixed with 1.2% of a dispersing agent (Leukanol 30% solution) and 48.8% of the new assistant.

A paste was also made containing:

13 % Ponsol dark blue BR (Schultz No. 763)
30.33% water
1.2 % Leukanol
55.5 % assistant Here again the quantities may be varied. We have found that in place of a mixture of the di- and tri-ethylolamines, that either tri-ethylolamine alone or di-ethylolamine may be substituted in the examples given. We have also found that mono-ethylolamine is also capable of effecting an improvement in dyestuff pastes, although not as great as that produced by either di- or tri-ethylolamine.

The following are the most striking advantages resulting from the invention:

1. They give the smoothest printing pastes with any thickening, characterized by a very pronounced binding.
2. They are excellent regulators of shades and always give very even results, especially eliminating unevenness which would originate from poor ageing conditions with the ordinary vat color printing pastes.
3. There is a better penetration, due to better solubility of the leucos, hence better fixation and better fastness.
4. The fastness to rubbing is increased.
5. The brilliancy is very much enhanced.
6. Due to better fixation and fastness properties, the grounds are left perfectly white.
7. Furthermore, mixtures of vat colors which always give very uneven shades, or at least far greater difficulties in securing standard shades by the old method, give very uniform coloring and a constant shade when made up with these assistants.
8. The pastes prepared according to the above process never dry out, constitute almost clear "solutions" and at no time show a tendency to speckiness. With these pastes one is almost certain to obtain without exception uniform and perfect prints.
9. The economy realized by obtaining a shade with half as much color in some instances is furthermore increased by the use of much less Rongalite and alkalis. This renders the use of these pastes especially interesting for silk printing or the printing of any fabrics whose fibers are sensitive to alkalis.
10. Furthermore, the addition of these assistants permits printing with vat colors which had been classified as unsuitable for this purpose (such as Indanthrene blue BCS or any similar vat dyestuff) due to the practical insolubility of their leuco derivatives.

As many apparently widely different embodiments of this invention may be made without departing from the spirit thereof, it is to be understood that we do not limit ourselves to the foregoing examples or descriptions except as indicated in the following patent claims.

We claim:

1. A color paste comprising vat dyestuff paste, glycerine and di-ethylolamine.
2. A color paste comprising vat dyestuff paste, glycerine and a mixture of di- and tri-ethylolamine.
3. A color paste comprising vat dyestuff paste, a dispersing agent and tri-ethylolamine.
4. A printed fabric, the prints thereon comprising a color resulting from the application to the fabric of a color paste containing a crude mixture of ethylolamine.
5. A printed fabric, the prints thereon comprising a color paste applied in the presence of a compound composed of glycerine and ethylolamine.
6. A printed fabric, the prints thereon resulting from the application of a color paste in admixture with glycerine and di-ethylolamine and tri-ethylolamine.
7. A printed fabric, the prints thereon comprising a color resulting from a paste composed of 200 to 400 parts of a press cake, 270 to 580 parts of ethylolamine mixture and 10 to 20 parts of glycerine.
8. A color paste comprising a vat dyestuff paste and a crude mixture of ethylolamine.
9. A color paste comprising a vat dyestuff paste and a mixture of di- and tri-ethylolamine.
10. A printed fabric, the prints thereon resulting from the application of a color paste containing ethylolamine.
11. A printed fabric, the prints thereon resulting from the application of a color paste containing a mixture of di- and tri-ethylolamine.
12. A printed fabric, the prints thereon resulting from the application of a color paste having admixed therewith the residue resulting from the distillation of the reaction products of ethylene oxide and ammonia.

In testimony whereof we affix our signatures.

JEAN GEORGES KERN.
CHARLES J. SALA.